United States Patent [19]

Progler

[11] 3,879,577

[45] Apr. 22, 1975

[54] DATA TRANSMISSION SYSTEM

[75] Inventor: Max Progler, Dellmensingen, Germany

[73] Assignee: Licentia Patent-Verwaltungs-GmbH, Frankfurt am Main, Germany

[22] Filed: Sept. 24, 1973

[21] Appl. No.: 399,695

[30] Foreign Application Priority Data

Sept. 23, 1972 Germany ............................ 2246826

[52] U.S. Cl. ........................ 178/23 A; 340/146.1 BA

[51] Int. Cl. ...... G08c 25/00; H04l 1/10; G06f 11/00

[58] Field of Search ........................ 178/23 A, 23 R; 340/146.1 BA

[56] References Cited

UNITED STATES PATENTS

| | | | |
|---|---|---|---|
| 3,641,494 | 2/1972 | Perrault et al. | 178/23 A |
| 3,646,518 | 2/1972 | Weinstein | 340/146.1 BA |

*Primary Examiner*—Thomas A. Robinson

*Attorney, Agent, or Firm*—Spencer & Kaye

[57] ABSTRACT

In a data transmission system in which blocks of binary data are transmitted over a transmission channel from a data source in a transmitter to a data user in a receiver, with each block being tested in the receiver and each incorrectly received block giving rise to an "error" receipt signal which is delivered to the transmitter over a return channel, retransmission of an incorrectly received block is effectuated by storing each transmitted block in the transmitter and delaying each received block in the receiver for a time equal to the period which elapses between transmission of a block and arrival at the transmitter of the receipt signal for that block, normally supplying each received block to the user after such delay, retransmitting each received block resulting in an error receipt signal upon arrival of such signal at the transmitter, and delivering each retransmitting block directly to the user without such delay if such retransmitted block does not give rise to another error receipt signal. Only those blocks which create an error receipt signal are retransmitted by the transmitter.

5 Claims, 1 Drawing Figure

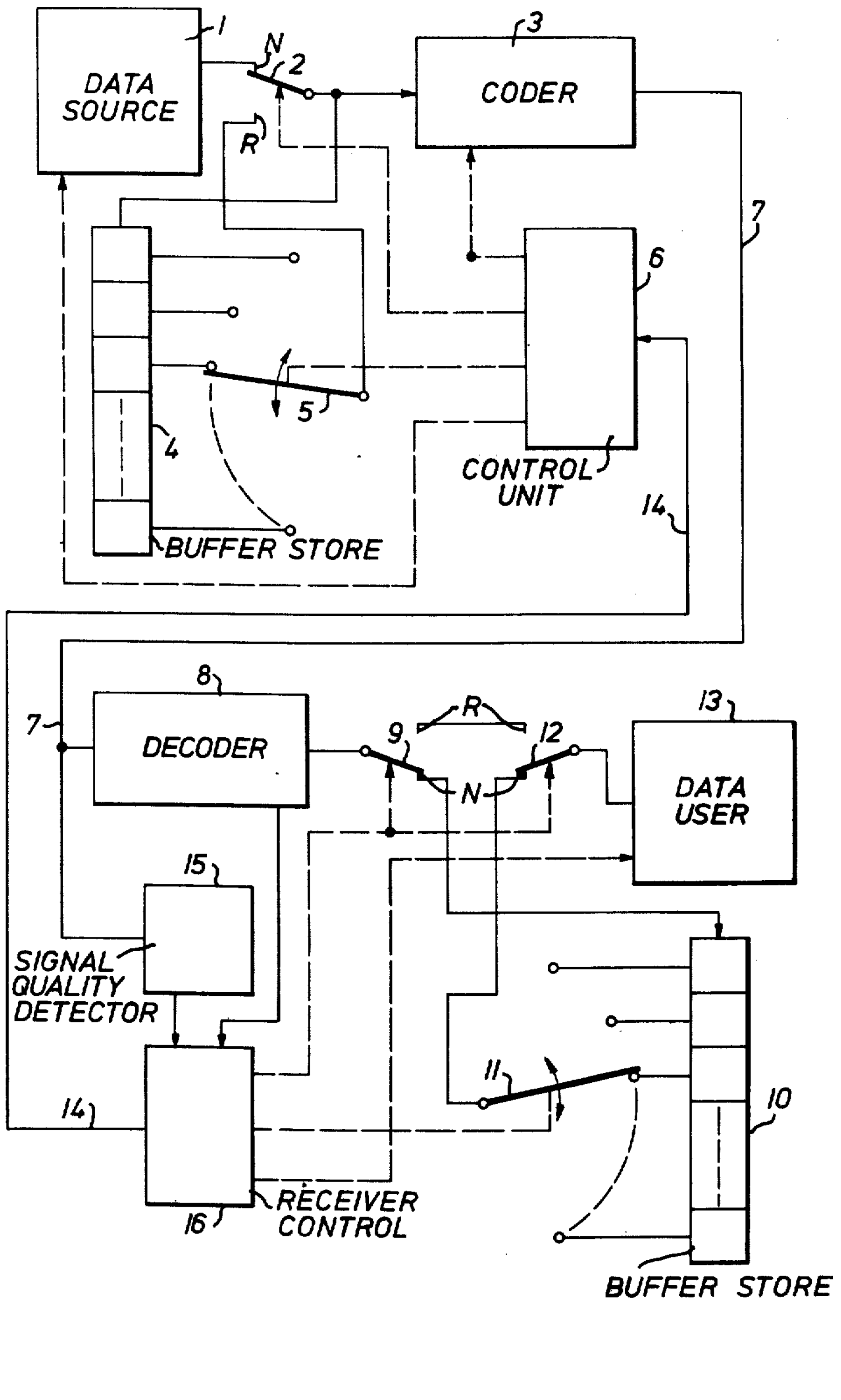
DATA SOURCE
1
N
2
R
3
CODER
7
6
4
5
CONTROL UNIT
14
BUFFER STORE
8
DECODER
7
9
R
12
13
N
DATA USER
15
SIGNAL QUALITY DETECTOR
11
10
14
RECEIVER CONTROL
16
BUFFER STORE

DATA TRANSMISSION SYSTEM

BACKGROUND OF THE INVENTION

The present invention relates to a system for the secure transmission of blocks of binary coded data from a transmitter to a receiver.

In such a system error correction is performed by transmission of signals indicating "correct" or "error" reception of each block, such receipt signals being delivered via a return channel from the receiver to the transmitter. Then at least all of these data blocks, which were indicated, by delivery of an error receipt signal, as having been incorrectly received are retransmitted from a store, or memory, provided at the transmitting end.

This store contains at any given time at least the L data blocks which were last transmitted during the time period for forward transmission and for transmission over the return channel in the system. This time period is known as the loop travel time.

For the secure transmission of data, usually in binary form, through channels subject to interference, two types of methods are usually employed which are both based on redundant coding: firstly, the forward correction methods in which the correction is effected automatically, based on the redundancy at the receiving station; and, secondly, the repetition methods in which the correction is effected by a repetition of the data received with errors when so requested by the receiver by way of a receipt signal.

Repetition methods, to which the present invention relates, generally require much lower expenditures than forward correction methods. They are preferably used in channels where groups of lines experience interference, such as for example the telephone lines of a public dial system.

A significant requirement for repetition processes is the presence of a return channel which permits the transmission of a receipt signal from the receiver back to the transmitter, indicating correct reception or error reception. Furthermore the delays in the data transmission necessary for the repetition must be tenable in the system.

Presently there exist essentially two repetition methods which both operate with so-called block securing and which permit continuous transmission of data blocks: the "alternating store system" and the "travel time controlled system".

In the "alternating store system" data blocks are alternately transmitted from two stores at the transmitting end, the blocks being protected by a redundant cyclic block code. The length of the blocks is here so selected that the receipt signal for one block must have arrived at the transmitting end before the succeeding block has been completely transmitted. This means that the block length must correspond at least to the loop travel time in order to permit continuous transmission. At the receiving end there are also provided two stores, with a storage capacity of one block each, into which the received blocks are alternatingly stored and from which they are discharged. Upon the occurrence of a repetition, the discharge is delayed by one block length, i.e. about one loop travel time period, if no special buffer stores are provided. The entire delay capacity thus corresponds to approximately four times the loop travel time.

In this system the block length is determined by the loop travel time and can usually not be optimally adapted to the channel. With long travel times and having interference the data throughput is rapidly decreased since the system requires considerable time for the repetitions due to the high susceptibility to interference of long blocks. Data transmission will finally become bogged down in continuous repetitions.

In the "delay time controlled system" the block length can be selected independently of the "loop travel time". The blocks are transmitted continuously and are simultaneously read into a buffer store located at the transmitting end and having a capacity which corresponds to the maximum travel time to be expected. With the aid of the receipt signals arriving in the return channel, the loop travel time is measured and the corresponding number of blocks is marked in the buffer store at the transmitting end. In the case of a request for repetition, only this number of blocks is repeated. The receiver no longer requires any special stores; the storage capacity thus corresponds to a single travel time period.

The drawback of such a system is that even if only one block is incorrectly received, because it contains interference, still the total number of blocks transmitted during the loop travel time is repeated, independently of whether they contain interference or not. This considerably reduces the data throughput, particularly with long travel times and heavy interference, mainly due to the unnecessary repetition of blocks and on the other hand because these blocks may experience interference during the repeated transmission, necessitating a renewed repetition, although they were received correctly during the first transmission.

SUMMARY OF THE INVENTION

It is an object of the present invention to eliminate at least certain drawbacks of prior art systems operating according to the repetition method.

It is a more specific object of the present invention to make the data throughput, or the effective transmission rate, independent of the loop travel time.

Systems according to the invention enable the block length to be optimally adapted to the channel and to be independent of the travel time. They also cause the number of blocks repeated to include only the blocks actually containing interference, i.e. to also be independent of the travel time.

In a system according to the invention, delay means are provided at the receiving end. The delay means may be composed of a memory arranged to store L data blocks. Sudh delay means assures that the received blocks are emitted only with a delay of at least L blocks and that when a block is erroneously received, only this one block is rejected and the transmission of an error receipt signal to the transmitter is initiated. The subsequently arriving (L+1)th block is checked and, if this block is correct, it will be sent directly instead of the rejected block without passing through the delay means. When an error receipt signal is received at the transmitting end, only the block transmitted L blocks previously is transmitted from the store provided at the transmitting end.

BRIEF DESCRIPTION OF THE DRAWING

The single FIGURE is a block circuit diagram of one preferred embodiment of a system according to the invention.

DESCRIPTION OF THE PREFERRED EMBODIMENTS

In the illustrated system, a data source 1 furnishes the data to be transmitted, for example in serial, binary form and is arranged to be started and stopped from an external point. The flow of data transmitted by source 1 is divided into blocks, or words, each containing $k$ bits and fed via switch 2 to a coder 3 where the data blocks are supplemented to constitute code blocks containing n bits. The block length $n$ is selected to be optimum, if possible, firstly to provide as low a code redundancy, n−k/n, as possible, and secondly to provide as low a susceptibility as possible to interference in the transmission channel. A certain security with respect to unrecognizable transmission errors is desired in such a system, e.g. an error probability $p_{rest} < 10^{-8}$.

The information blocks having the length of $k$ bits are simultaneously fed into a buffer store 4 which consists of a total of $L_{max}$ partial stores each of the length $k$. A switch 5 serves to set the number of active L blocks according to the existing loop travel time ($L \leqq L_{max}$). This is done in dependence on the arrival of receipt signals at a control unit 6.

From coder 3 the code blocks reach, after a certain delay which corresponds to the forward travel time of the transmission channel 7, a decoder 8 at the receiving end. This decoder checks blocks for transmission errors with the aid of their check bits, removes the check bits, and transfers the information portion, i.e. the $k$-bit data blocks, via a switch 9 into a buffer store 10 which is constructed to correspond to store 4.

The data travels from the store 10 via switches 11 and 12 to a data user 13. User 13 is arranged to receive, similarly to source 1, serial, binary information at a given bit rate. The changing of the position of the switches and clock pulse generation is effected, in dependence on the error signals from decoder 8 and a signal quality detector 15, by a receiver control 16.

A receipt signal for each received data block is returned to the transmitter via a return channel 14, depending on whether the block has been received correctly or with errors, and is there evaluated in control unit 6. The receipt signal may result, for example, from the information furnished by the decoder 8 and the signal quality detector 15.

This receipt signal arrives at the transmitter after a certain travel time, determined by the length of return channel 14. The number L of blocks occurring between the transmission at the transmitting end of a first block and the transmission of a subsequent block coincident with arrival at the transmitter of the complete receipt signal for the first block corresponds to the loop travel time. If, for example, block No. 1 is transmitted and the complete receipt signal for this block arrives during the transmission of block No. 6, then L = 6. In this way it can be decided, upon the arrival of an error receipt signal, which block is to be repeated.

A prerequisite for the method on which the novel system is based is thus that transmitter and receiver "know" the loop travel time, i.e. the parameter L. It will also be initially assumed that no errors occur in the return channel.

The determination of the loop travel time can be effected, for example, by the transmitter and by the receiver independently of one another within the context of the so-called "starting routine" during the establishment of the transmission path and the beginning of the transmission. In addition the transmitter can transmit the result of its measurements to the receiver and the receiver can compare this with its own measurement, or the receiver can do completely without its own delay time measurement and be informed of the parameter L by the transmitter.

The starting routine may be as follows, for example: the transmitting station begins the transmission by transmitting so-called synchronizing blocks. These blocks may be formed, for example, by permissible code words of the safety code employed. They are assumed to consist in part of a fixed pattern and in part of a variable pattern. The fixed pattern serves to produce the block raster for the safety code. The variable pattern serves to transmit various items of information, for example possibly required synchronization symbols for the transmission code employed, address symbols to select the appropriate final receiver, and the like. Also, the transmitter can inform the receiver of the result of its loop travel time measurement within this variable pattern.

The transmitted synchronization blocks are assumed to initially contain, alternatingly, synchronization symbols and an address. If the variable portion is long enough, these blocks may contain both of them simultaneously. With these synchronization blocks the receiver initially effects the bit synchronization and then the block synchronization. This also automatically reveals the clock pulse for the signals and the address of the final receiver.

A synchronization block is accepted by the receiver only if checking by means of the safety code and the signal quality detector proved the absence of errors. Upon receipt of the first synchronization block without errors, the receiver begins to transmit correct receipt signals in the block raster pattern through return channel 14.

These receipt signals serve to synchronize the return channel in the transmitter. As soon as this is accomplished, the transmitter transmits a synchronization block whose variable portion contains, for example, the number 0. This block is followed by blocks containing, for example, the number 1. Furthermore, the transmitter counts all transmitted blocks beginning with the block containing the number 0, this representing the beginning of the measurement of the travel time in the transmitter. As soon as the receiver has recognized the block with the 0, it begins to transmit error receipt signals and counts them, this representing the beginning of the travel time measurement in the receiver.

Upon receipt of the first error receipt signal the transmitter stops counting, at which time the counter contains the number L corresponding to the loop travel time. This number, which is greater than 1, is transmitted to the receiver with the next synchronization block. After this block, the actual transmission begins at once.

The measurement at the receiver is such that as soon as the receiver has received a synchronizing block with a number which is greater than 1, it stops the counting of receipt signals and compares the count with the number received in the synchronization block. Upon coincidence a correct receipt signal is transmitted and the system is switched to normal reception.

As stated above, the travel time comparison or the entire travel time measurement can also be eliminated in the receiver and the number L transmitted in the last synchronization block can be used to set the travel time identification in the receiver.

The required security of the transmission channel can be realized, for example, by a synchronous transmission of the receipt signals. Also, each receipt signal takes as much time to travel as a code block in the main channel. To maintain synchronism, the correct receipt signal may be such, for example, that 0 and 1 are transmitted alternately, and for an error receipt signal the polarity previously applied remains in effect. Another possibility is the transmission of one or more polarity changes per data block in a defined phase position as the "correct" receipt signal and a shift of this phase position, for example, by 180° for the error receipt signal.

In order to securely evaluate each received receipt signal integration may be effected for the duration of the receipt signal with performance of a subsequent plurality decision, known as "integrate and dump"; the integration may be effected in an analog manner as well as digitally by scanning and counting.

The details of the transmission or the repetition mechanism, respectively, will now be described. At the beginning of transmission, the stores 4 and 10 are each set, with the aid of switches 5 and 11, respectively, to a length of L blocks, it being assumed that there will be no substantial change in the loop travel time during the transmission. Both stores are thus able to store exactly the number of blocks which are transmitted during one loop travel time period. Since the L-th block is usually stored in the decoder at the receiving end, store 10 may be shorter by one block if required. At the receiving end the blocks are thus discharged, or transferred out, from store 10 with a delay of one loop travel time period subsequent to their reception.

If now a faulty block is received during the transmission, this block is not stored in store 10 but rejected and for the duration of one block no informtion is transferred to the user 13. In the meantime an error receipt signal is transmitted. When the transmitter has received the error receipt signal, the respective erroneously received block is just then available for discharge at the output end of store 4. In order to repeat this block, the delivery of data from source 1 is stopped and the movable contact of switch 2 is switched from its normal position N to its repeat position R and this block is coded and transmitted anew. After this block, normal transmission is resumed, provided correct receipt signals are received, i.e. switch 2 is placed into position N and source 1 is switched on again. In this receiver, the repeated block is then present in decoder 8 when the original, erroneously received block would be present for discharge at the output of store 10. Switches 9 and 12 are now switched to their repeat position R and, instead of the faulty block, the repeated block is discharged at precisely the correct point in the data stream to enter the user 3. The repeated block must of course contain no errors.

Since in this "fully synchronous" system the travel time is known and erroneous transmission of the receipt signal is sufficiently improbable, the amount of repetition can be limited to the absolute minimum, i.e. to the erroneously transmitted blocks. The repetition need not be announced or marked by special measures, e.g "synchronization signals" etc., as is the case in the known procedures.

The two stores 4 and 10 should be designed to correspond to the maximum loop travel time, $L_{max}$, to be encountered. In order for the receiver to know when the faulty block is present at the output of 10 and when thus switches 9 and 12 need be switched over in order to directly discharge the retransmitted block, it is advisable to have each information block, consisting of $k$ bits, preceded, after decoding in decoder 8, by a receipt bit, for example a 0 for "correct". If the block to be stored is incorrect, however, only the corresponding receipt signal, e.g. a 1, is stored in store 10 at the respective block location and the block data itself is not stored. The store 10 thus consists of $L_{max}$ locations each having a capacity of $k+1$ bits.

A critical case for the described system exists when the repeated block also experiences interference since then the capacity of the receiving store 10 will be exceeded. The following solutions are possible:

1. if permitted, the block can be discharged as a faulty block and can possibly be marked with an error indication;
2. a second or a number, $i$, of stores, respectively, when the same block is repeated $i$ times, can be provided which correspond to store 10;
3. the entire transmission can be stopped until the faulty block has been accurately received. This results in a certain loss in the transmission rate which, however, will generally be negligible.

A combined solution according to solutions 2 and 3, above, may be advisable; for example after two repetitions the transmission can be stopped until the faulty block has been transmitted correctly.

As already mentioned, it may be advantageous to change the repetition mode after two repetitions. If a repeated block again experiences interference, the receiver will send out only error receipt signals until this block has been received correctly. All L-1 blocks arriving just after the block which has experienced interference for the second time are thus rejected in any case, since no storage space is available for them in the receiver. As soon as the transmitter receives the second repetition request for the same block, it stops source 1 and repeats the contents of store 4 until the first correct receipt signal is received at the transmitter for this block. Only then is the source 1 switched on again and the transmission continues in the normal mode.

Since the L-1 blocks transmitted after the twice repeated block are in any event rejected by the receiver, an advantageous modification consists in the continued transmission of the block to be repeated instead of these rejected blocks. The probability of a renewed error is then generally much lower since in many cases at least one of the L blocks will be error-free.

This variation is of particular advantage for very long travel times and a relatively high multiple repetition rate. A further improvement can be realized in that at least a number of the repetitions of the block L arriving with interference, the number being equal to L, are not rejected but rather at least some of these, equal to another quantity Z, are stored. From these Z stored blocks the transmitted block can be reconstructed by a bit-by-bit majority decision. This can be done merely for the information portion or also, for increased security, for the entire code block. In the latter case this reconstructed block is again checked by the decoder in the receiver to determine whether it constitutes a permissible code word.

The majority decision can be effected either with the first Z blocks which arrive or by selection according to a certain scheme, for example by selecting every other block. The choice of which Z blocks are used for the reconstruction can also be made by the signal quality detector 15. Then only those blocks are selected which do not exceed a certain degree of error.

Moreover, the bits used for the majority decision can also be weighted by the signal quality detector depending on their degree of error with the aid of a "dependability measure", e.g. 0–0.25–0.5–0.75–1. If it is possible in the receiver to always effect the reconstruction with $Z<L$ blocks with sufficient accuracy, the transmitter need not wait for the receipt signal for the transmission of these Z identical blocks but can immediately transmit new information to follow them.

Under certain circumstances it may be technically advantageous to make the storage capacity of stores 4 and 10 fixed and to design them as purely static delay lines or shift registers of the length $L_{max}$. In this embodiment the receipt signals are delayed in the receiver, or also in the transmitter, by a period corresponding to the time required to transmit ($L_{max}$–L) blocks with the aid of a variable delay line so that the entire travel time will always correspond to $L_{max}$.

It has previously always been assumed that the loop travel time, corresponding to the transmission of L blocks is precisely known in the transmitter and in the receiver and that the receipt signals are transmitted with a negligible error frequency. If this is not the case, unexpected as well as unnecessary repetitions may occur and requested repetitions may not be made. Thus it is necessary for the receiver to recognize genuine repetitions as such. For this purpose each transmitted data block may be provided with an extra bit, to precede it for example, which indicates whether the block is being repeated. Or, every repetition may be begun with a special "repetition beginning block". This may be the block, for example, which is used at the beginning of the transmission for synchronizing the blocks. The determination as to which method is more advisable depends mainly on the repetition rate to be expected. For further control, the blocks in the receiver and the receipt signals therefor in the transmitter may be counted in modulo L. For a repetition, the transmitter informs the receiver, for example in the "repetition beginning block", of this number and the receiver compares it with its own.

The case where an error receipt signal is falsified to a correct receipt signal is particularly critical, i.e. when a requested repetition is not made. Since the receiver will notice this only after completion of the travel time and can only then request a further repetition, it must be possible to store, in the transmitter and in the receiver, the data blocks transmitted during the number of loop travel time periods corresponding to the number of times it is possible for the same error receipt signal to be falsified.

It will generally be more favorable to make the falsification of an error receipt signal onto a correct receipt signal sufficiently improbable, at the expense of the falsification of a correct receipt signal into an error receipt signal. In this case it can only happen that too many repetitions will occur, which does not matter, from the standpoint of correct reception. The data throughput is in this case generally not significantly worsened.

This can be effected, for example, by causing a receipt signal to be recognized as correct only when it deviates only slightly from its rated value, this deviation being determined by a given threshold value. If the distortion of the received receipt signal exceeds this value, it is evaluated as an error receipt signal. For reasons of simplicity the receipt signal synchronization in the transmitter can also be eliminated. It is then advisable to transmit, for example, a 0 for correct and a 1 for error. The received receipt signals are interrogated in the transmitter in synchronism with the data block raster. Advantageously higher demands will again be placed on the correct receipt signal than on the error receipt signal in order to make a simulation of the former sufficiently improbable.

Since the receipt signals arriving at the transmitter are generally not in phase with the transmitting block raster, the subsequently arriving receipt signal also plays a part in the evaluation of a given receipt signal. That is, a repetition will be initiated if a given receipt signal and/or the subsequent receipt signal are interpreted as an error receipt signal. This only slightly worsens the efficiency of the transmission.

Finally it should be noted that the proposed system also permits full duplex transmission. In this case the data blocks transmitted in one direction contain the receipt signals for the data blocks transmitted in the other direction. Each receipt signal may be contained, for example, as an additional signal bit in each data block. This of course will result in the loss of one information bit per block.

In addition to the features defined in the claims that follow, the following features are also considered to be part of the present invention:

1. A number, $i$ ($i>1$), of additional stores corresponding to store 4 can be provided in the receiver to permit repeated transmission of the same faulty block up to $i+1$ times and so that only starting with the ($i+1$)th required repetition is the system switched to the mode of operation in which, when a further repetition is requested from the transmitter this same block is transmitted several times directly after its first transmission until its correct receipt has been acknowledged by the receiver by way of a correct receipt signal and the receiver, when it receives a block which contains errors for the second time in a row, stops the discharge to the user and transmits error receipt signals until the desired block has been received without errors, all blocks arriving after the block containing interference for the second time during one loop travel time period being rejected and correct receipt signals being transmitted for one loop time period after receipt of the multiply repeated uninterfered with block, with rejection of all blocks following thereafter within one loop travel time period, whereupon the transmission is continued.

2. In the case where $i=1$ (one additional store), the correctly received information blocks are read first into the first of the two stores (the first store is located next to the decoder 8) together with their correct receipt signals via a switch which corresponds to switch 9 and which will be in position N and they are shifted after passing through L-1 block locations, via other switches which are equivalent to the switch 11 and to the switch 9 (both in normal position N) into the second store of the two. These blocks are read out after passing through L-1 block locations, each having a capacity of $k+1$ bits, via a switch which belongs to the second store and corresponds to switch 11, and are conveyed by switch 12 (in position N) so that the blocks are discharged to the user 13 after a delay of a total of 2(L-1) block periods. At the arrival of a faulty block this faulty block is rejected and only its error receipt signal is stored in the first of the two stores. Upon arrival of the repeated block, this block, if it does not contain any errors, is directly fed into the second store via two switches, one located in the first store and the other in the second store. If the repeated block contains errors the block is again rejected and only its error receipt signal is fed into the store second store. Upon arrival of the twice repeated block, this block is discharged directly via two switches, one being said switch in the first store and the other being the same like switch 12, to the user, if it is free of errors, and with a renewed presence of errors the system is switched to the mode of operation described for feature 1, above.

3. The information stores can be either only stores having a length of $L_{max}$ sections and without outputs at each location or only with outputs after $a$ locations ($1<a<L_{max}/2$), and the receipt signals are instead delayed by the corresponding period so that the loop travel time is increased as a whole to the value $L_{max}$ or the next highest value of L which can be set to correspond to a length of $a$ locations.

4. During a multiple repetition, the L identical blocks transmitted in succession are not rejected by the receiver if they should be faulty when received, but rather they, or at least Z of them, are stored and an attempt is made to reconstruct the information portion of the $z$ times interfered-with block by a bit-by-bit majority decision through all Z blocks.

5. To increase reliability, the entire data block including the check bits, is reconstructed with the aid of a bit-by-bit majority decision and is then subsequently checked once more by the decoder for the presence of errors.

6. In order to reduce storage requirements and to increase reliability, the Z blocks containing the smallest degree of error, or variations which lie below a given threshold value, are selected by an interference detector.

7. The stored bits are weighted by an interference detector with a dependability factor so that their influence in the majority decision thus depends on the degree of interference which they experienced.

8. With a sufficiently secure reconstruction of the multiply interfered with block from the Z blocks, the transmitter will no longer wait for the corresponding correct receipt signal but will rather continue the transmission in the normal mode immediately after the transmission of the required number of identical blocks.

9. At the beginning of the transmission the transmitting station transmits so-called synchronization blocks which constitute a code word of the safety code employed and whose information bits consist of a fixed pattern for block synchronization for the code blocks and a variable pattern for the transmission of address and synchronization signals for the transmission code as well as for the transmission of the measured loop travel time, these synchronization blocks initially containing only synchronization signals and/or address signals. The receiver begins to transmit correct receipt signals upon completion of the synchronization with a correct block. The transmitter initially synchronizes the return channel with the aid of the correct receipt signals. Subsequently a synchronization block containing, for example, the number 0 is transmitted and then blocks containing, for example, the number 1, and all these blocks are counted. The receiver, upon detecting a block with the number 0, transmits error receipt signals which are also counted. The transmitter upon the receipt of the first error receipt signal considers the number (count) of the presently transmitted block as the loop travel time L, effects the appropriate settings and informs the receiver of this number in the next synchronization block, whereupon it immediately proceeds with the transmission of information; and the receiver after receiving a synchronization block containing a number greater than 1, considers the number of the presently transmitted error receipt signal as its loop travel time and the receiver compares the two numbers and makes the required settings only upon coincidence, whereupon it transmits a correct receipt signal.

10. The correct receipt signal is transmitted by the receiver in synchronism with the arriving blocks in the form of channges in polarity at a frequency which is one-half the block frequency, each receipt signal having the same duration as the corresponding block. The error receipt signal is constituted by this same change in polarity shifted in phase by 180°, or the signal remains in the presently occurring polarity and the transmitter effects secure evaluation of the receipts by analog or digital integration for the duration of one receipt signal period.

11. With insufficient reliability of the receipt signals, the reliability of the error receipt signals is increased with respect to falsifications at the expense of the reliability of the correct receipt signals, and repetitions, which may possibly not be expected by the receiver, are identified by a special marking block which precedes each repeated block, this block possibly being the synchronization block used at the beginning of the transmission.

12. The receipt signals are interrogated in synchronism with the transmitting block raster in the main channel so that synchronization of the return channel is not required.

In the following there shall be made some remarks about the units which are shown in the single FIGURE. The data source 1 will be any kind of input equipment which comprises, if necessary, means for a parallel to serial conversion of the data to be transmitted. For example the data source 1 may be a computer or a tape transmitter. The coder 3 and decoder 8 are well known means for use in data transmission systems. For example, such means are shown and described in more detail in chapter 11 of the book Error-Correcting Codes written by W. W. Peterson and published in 1961 by the MIT Press and John Wiley & Sons. The two buffer stores 4 and 10 may be as mentioned above shift registers with a plurality of outputs, at which information will be taken off. Yet the buffer stores may also be realized for example as random access memories or as conventional matrix stores.

The data user 13 will be any kind of output equipment which comprises if necessary means for a serial to parallel conversion. For example this data user 13 may be a remote computer or a memory.

The other units namely control unit 6 and receiver control 16 are both logical networks which are connected together by the return channel 14. The receiver control 16 comprises means for connecting the output signal of the signal quality detector 15 and a correct or error signal of the decoder 8. The signal quality detector 15 itself, for example, will comprise threshold means which control the transmitted blocks for the correctness of their bits. In detail, such a signal quality detector is shown and described in the German patent 1 249 910.

In the receiver control 16 there will be produced the signals for switching the switches 9 and 12 to their repeat position R, if necessary. Furthermore the receiver control 16 comprises a clock generator which guarantees the synchronism with the data user 13, and counting means for advancing the schematically shown switch 11. If there has been recognized a disturbed block the receiver control 16 will produce an error signal which will be transmitted to the control unit 6. This control unit comprises, in an analogous manner to the receiver control 13, counting means for controlling the switch 5. Furthermore the control unit 6 contains means which control the switch 2 in correspondance to the switches 9 and 12. On the other hand there will be produced a control signal for the coder 3 for the two states, coding and shifting. The connection between control unit 6 and the data source 1 is necessary for informing the data source whether it is allowed to send data or not.

It will be understood that the above description of the present invention is susceptible to various modifications, changes and adaptations, and the same are intended to be comprehended within the meaning and range of equivalents of the appended claims.

What is claimed is:

1. In a system for the secure transmission of binary coded data in blocks, which system includes a transmitter containing a source of such data blocks, a receiver containing a data user, coding means associated with the transmitter and arranged to receive successive data blocks and to code each such block to constitute a code block containing error test information, means defining a forward transmission channel connected to the output of the coding means for conveying such code blocks serially from the transmitter to the receiver, means defining a return channel for conveying signals from the receiver to the transmitter, and error correction means including test means in the receiver for testing each code block received from the transmitter for transmission errors and for supplying a correct receipt signal to the return channel for each code block which is correctly received and an error receipt signal to the return channel for each code block received with errors, the loop travel time between transmission of a given code block from the transmitter and arrival at the transmitter of the receipt signal corresponding to that given code block being substantially equal to the time required for transmitting a succession of L blocks, first storage means in the transmitter for storing the data associated with L successive data blocks at any given time and connected to receive the data blocks as they are transmitted from the source, transmitter control means in the transmitter operatively connected to the return channel and to the first storage means for retransmitting from the first storage means, and over the forward transmission channel, each code block for which an error receipt signal is supplied to the return channel, second storage means in said receiver, said second storage means having a capacity of at least L-1 blocks and being normally connected to the output of said forward transmission channel for storing each block which it receives and delaying it by a delay period at least equal to the loop travel time, first signal flow directing means connected in said receiver for normally connecting the data user to the output of said second storage means and arranged to selectively connect the data user alternatively to the output of said forward transmission channel, and receiver control means operatively connected to said test means and to said signal flow directing means for causing said signal flow directing means to alternatively connect the data user to the output of said forward transmission channel at a selected time after production of an error receipt signal, which selected time is substantially equal to loop travel time, whenever said test means is supplying a correct receipt signal, said receiver control means also being connected to said transmitter control means for causing retransmission, upon arrival at said transmitter of an error receipt signal, of only that block to which such receipt signal relates, the improvement wherein:

said test means comprise decoding means connected in series with said forward transmission channel so that the output of said decoding means constitutes the output of said forward transmission channel, said decoding means serving to decode each received code block to reestablish the corresponding uncoded data block, the output of said decoding means being connected to said first signal flow directing means in a manner such that said decoding means is connected in series between said forward transmission channel output and said first signal flow directing means; and said transmitter further comprises: connecting means permanently establishing a common input connection connected to the input of said coding means and the input of said first storage means; second signal flow directing means operatively connected to be controlled by said transmitter control means and arranged to normally connect said common input connection to the output of said source of data blocks as long as correct receipt signals are being supplied to said transmitter control means and to selectively and temporarily connect the output of said first storage means to said common input connection, for a time equal to that for transmitting a complete code block, upon arrival of an error receipt signal at said transmitter control means;

whereby production of an "error" receipt signal will result in retransmission of the entire code block to which such signal relates and the retransmitted data block will reach the data user at exactly the same time that the originally transmitted data block would have reached the data user if it had been correctly received.

2. An arrangement as defined in claim 1 wherein;

said transmitter control means are arranged to transmit, upon arrival at said transmitter of an "error" receipt signal, the block to which such signal relates a plurality of times in succession until subsequent arrival at said transmitter of a correct receipt signal;

said receiver control means are arranged, upon the second successive arrival of a block containing errors, to cause said signal flow directing means to terminate delivery of blocks to the user and to supply error receipt signals until such block has been correctly received, said receiver control means being further arranged to cause supplying of error receipt signals until such block has been correctly received, to reject all blocks arriving during one loop travel time period after such second successive arrival of a block containing errors, to cause supply of correct receipt signals for one loop travel time period after correct receipt of such block, to reject all blocks arriving during one loop travel time period thereafter, and to subsequently reestablish transmission of subsequent blocks from the data source.

3. An arrangement as defined in claim 1 wherein said first storage means comprises at least L serially connected block storage locations; said transmitter control means are connected to the data source to stop the flow of data therefrom upon arrival of an error receipt signal, and said transmitter further includes:

selector means operatively arranged to be controlled by said transmitter control means and arranged for selective connection to the output of that location of said first storage means whose distance from the input end of said first storage means corresponds to the existing loop travel time for the current transmission.

4. An arrangement as defined in claim 1 wherein said second storage means have a plurality of block storage locations and a bit capacity in each location equal to the number of data bits in each data block, said receiver further comprises second selector means operatively associated with said second storage means or giving said second storage means an effective block storage capacity of L blocks, and wherein said test means are arranged to reject each received block which gives rise to an error receipt signal to supply to said second storage means, in place of such block, the error receipt signal associated therewith.

5. A method for correcting errors occurring in the transmission of data in a system for the secure transmission of binary coded data in blocks, which system includes a transmitter containing a source of such data blocks, a receiver containing a data user, coding means associated with the transmitter and arranged to receive successive data blocks and to code each such block to constitute a code block containing error test information, means defining a forward transmission channel connected to the output of the coding means for conveying such code blocks serially from the transmitter to the receiver, means defining a return channel for conveying signals from the receiver to the transmitter, and error correction means including test means in the receiver for testing each code block received from the transmitter for transmission errors and for supplying a correct receipt signal to the return channel for each code block which is correctly received and an error receipt signal to the return channel for each code block received with errors, the loop travel time between transmission of a given code block from the transmitter and arrival at the transmitter of the receipt signal corresponding to that given block being substantially equal to the time required for transmitting a succession of L blocks, the test means including decoding means connected in series with the forward transmission channel so that the output of the decoding means constitutes the output of the forward transmission channel, the decoding means serving to decode each received code block to reestablish the corresponding uncoded data block, and the error correcting means further including first storage means in the transmitter for storing the data associated with L successive data blocks at any given time, and connected to receive the data blocks as they are transmitted, transmitter control means in the transmitter operatively connected to the return channel and to the first storage means for retransmitting from the first storage means, and over the forward transmission channel, each code block for which an error receipt signal is supplied to the return channel, second storage means in the receiver normally connected to the output of the decoding means for storing each data block which it receives and delaying it by a delay period at least equal to the loop travel time, signal flow directing means connected in the receiver for normally connecting the data user to the output of the second storage means and arranged to selectively connect the data user alternatively to the output of the decoding means, and receiver control means operatively connected to the decoding means and to the signal flow directing means for causing the signal flow directing means to alternatively connect the data user to the output of the decoding means at a selected time after production of an error receipt signal, which selected time is substantially equal to the loop travel time, whenever the test means is supplying a correct receipt signal; the receiver control means also being connected to the transmitter control means for causing retransmission, upon arrival at the transmitter of an error receipt signal, of only that code block to which such receipt signal relates, said method comprising the steps of:

simultaneously transmitting the data blocks to the coding means and to the first storage means for storage of successive data blocks in the first storage means;

coding each successive data block in the coding means to form corresponding code blocks and transmitting the resulting code blocks to the receiver via the forward transmission channel;

decoding each code block in the decoding means to reestablish the corresponding uncoded data block, producing a receipt signal for each such code block, and transmitting each such signal to the receiver control means and then via the return channel to the transmitter control means; and for each code block which results in the production of a correct receipt signal, conducting the corresponding uncoded data block from the output of the decoding means to the input of the second storage means and then conducting such data block to the data user after such delay period, and for each code block which results in the production of an error receipt signal, connecting the input of the coding means to the output of the first storage means at a time when the corresponding data block is being read out from the first storage means for retransmitting the code block corresponding to such error receipt signal and connecting the output of the decoding means directly to the input of the data user at a time when the retransmitting code block is being decoded by the decoding means, whereby the data block corresponding to the retransmitted code block is inserted into the flow of data blocks to the data user at exactly the desired point in time.

* * * * *